United States Patent [19]

Weiss

[11] Patent Number: 4,501,021
[45] Date of Patent: Feb. 19, 1985

[54] FIBER OPTIC DATA HIGHWAY

[75] Inventor: Edward L. Weiss, Quakertown, Pa.

[73] Assignee: General Signal Corporation, Stamford, Conn.

[21] Appl. No.: 373,916

[22] Filed: May 3, 1982

[51] Int. Cl.³ ............................................... H04B 9/00
[52] U.S. Cl. ..................................... 455/601; 455/607; 455/612; 370/1; 370/88
[58] Field of Search ............... 455/601, 606, 607, 612; 370/86, 16, 88; 434/825.05

[56] References Cited

U.S. PATENT DOCUMENTS

| 3,859,468 | 1/1975 | Smith et al. | 370/86 |
| 4,416,008 | 11/1983 | Takahashi et al. | 370/88 |
| 4,460,994 | 7/1984 | Scanlon et al. | 370/88 |

FOREIGN PATENT DOCUMENTS

| 55-15643 | 12/1980 | Japan | 455/600 |
| 2073407 | 10/1981 | United Kingdom | 455/617 |

OTHER PUBLICATIONS

Juliusburger, H. Y. & D. Wortzman, "Multi-Peer Access Loop Communication System", IBM Tech. Disc. Bul., Mar. 1980.

*Primary Examiner*—Robert L. Griffin
*Assistant Examiner*—Timothy K. Greer
*Attorney, Agent, or Firm*—W. G. Miller, Jr.; Harold Huberfeld

[57] ABSTRACT

A communications system having a data highway made up of two optical communications channels forming a ring to interconnect stations whose signals are interfaced with the ring by an optical-electrical repeater. The repeaters include an optical detector and an optical transmitter for each channel. These are coupled so that they normally function as repeaters except when the repeater is associated with a station which is transmitting. Means are provided for preventing that repeater from repeating and further means are provided for receiving the transmitted signal at the transmitting station after it has gone around the ring for checking the condition of the ring.

4 Claims, 8 Drawing Figures

SYSTEM MAP EXAMPLES

| AFTER POWER UP INITIALIZATION | 32, 63 & 3 NOT THERE | 33-47, 3-30 NOT THERE | ALL BUT 2 NOT THERE | 33, 63 & 4 COME UP |
|---|---|---|---|---|
| HIGH LOOP | | | | |
| 1-2, 0 | 1-2, X | 1-2, X | 1-2, 0 | 1-2, 0 |
| 2-3, 0 | 2-4, X | 2-31, X | 2-2, X | 2-4, X |
| 3-4, 0 | 3-4, 0 | 3-4, 0 | 3-4, 0 | 3-4, 0 |
| : | 4-5, X | : | 4-5, 0 | 4-2, X |
| : | : | : | : | : |
| : | : | : | : | : |
| : | : | : | : | : |
| 30-31, 0 | 30-31, X | 30-31, 0 | | |
| 31-1, 0 | 31-1, X | 31-1, X | 31-01, 0 | 31-1, 0 |
| LOW LOOP 1 | | | | |
| 32-33, 0 | 32-33, 0 | 32-01, X | 32-33, 0 | 32-33, 0 |
| : | 33-34, X | 33-34, 0 | : | 33-01, X |
| 46-47, 0 | : | : | : | : |
| 47-01, 0 | 47-01, X | 47-01, 0 | 47-01, 0 | 47-01, 0 |
| LOW LOOP 2 | | | | |
| 48-48, 0 | 48-49, X | | 48-49, 0 | 48-49, 0 |
| 50-51, 0 | : | | : | : |
| : | : | | : | 62-63, 0 |
| : | 61-62, X | | : | 62-63, 0 |
| 62-63, 0 | 62-01, X | | : | 62-63, 0 |
| 63-01, 0 | 63-01, 0 | | 63-01, 0 | 63-01, X |

FIBER OPTIC DATA HIGHWAY

BACKGROUND OF THE INVENTION

This invention relates to providing for transfer of information among controller stations in a distributed control system. In particular it relates to a data highway, where the several stations or group of stations are arranged sequentially along one transmission line rather than being arranged radially around a central junction point or a master station. Electrical transmission lines have been used for effecting such information transfer, but they suffer from limited bandwidth, are subject to radio frequency interference, and can present a safety hazard. Fiber optic transmission lines do not suffer from the deficiencies cited for electrical lines, but their use in sequential multi-station applications has been limited by the cost and design constraint imposed by the difficulty of tapping fiber cables. The object of this invention is to effect a reliable fiber optic two-way communication system among many controller stations which may be distributed over a large area. The invention uses repeater stations in a bi-directional loop with a fiber optic data highway. It requires no signal mixing, switching, or splitting devices, and provides fault tolerance for either station failure or transmission line failure.

There are two major requirements of the communication system for an industrial process distributed control system. The first is that it be capable of serving numerous stations over distances commonly found in industrial process plants. The second is that it be fault tolerant. That is, the system must not fail as a result of a station fault or a transmission line fault.

The fault tolerance criterion could be met by employing a bi-directional in-line cabling arrangement with passive tapping at each station, but high insertion and tapping losses would preclude such a system serving more than a few stations, regardless of distance. A "star" configuration is also fault tolerant, and could serve a significantly larger number of stations, but practical system distances are limited. Furthermore, such systems have excessive cabling costs because each station is connected to the others through a central mixing, splitting device. In-line and ring repeater station systems have been described in the prior art, some using by-pass switches to guard against station failure, but such systems are still vulnerable to cable faults. In contrast with the prior systems, the present invention uses a bi-directional ring of repeater stations. Repeater action is halted at whichever station is transmitting to prevent perpetually circulating signals.

SUMMARY OF THE INVENTION

In accordance with this invention there is provided a communications system having a data highway made up of two optical communications channels forming a ring to interconnect stations whose signals are interfaced with the ring by an optical-electrical repeater. The repeaters include an optical detector and an optical transmitter for each channel. These are coupled so that they normally function as repeaters except when the repeater is associated with a station which is transmitting. Means are provided for preventing that repeater from repeating and further means are provided for receiving the transmitted signal at the transmitting station after it has gone around the ring for checking the condition of the ring.

DETAILED DESCRIPTION OF THE PREFERRED EMBODIMENT

Figure 1:
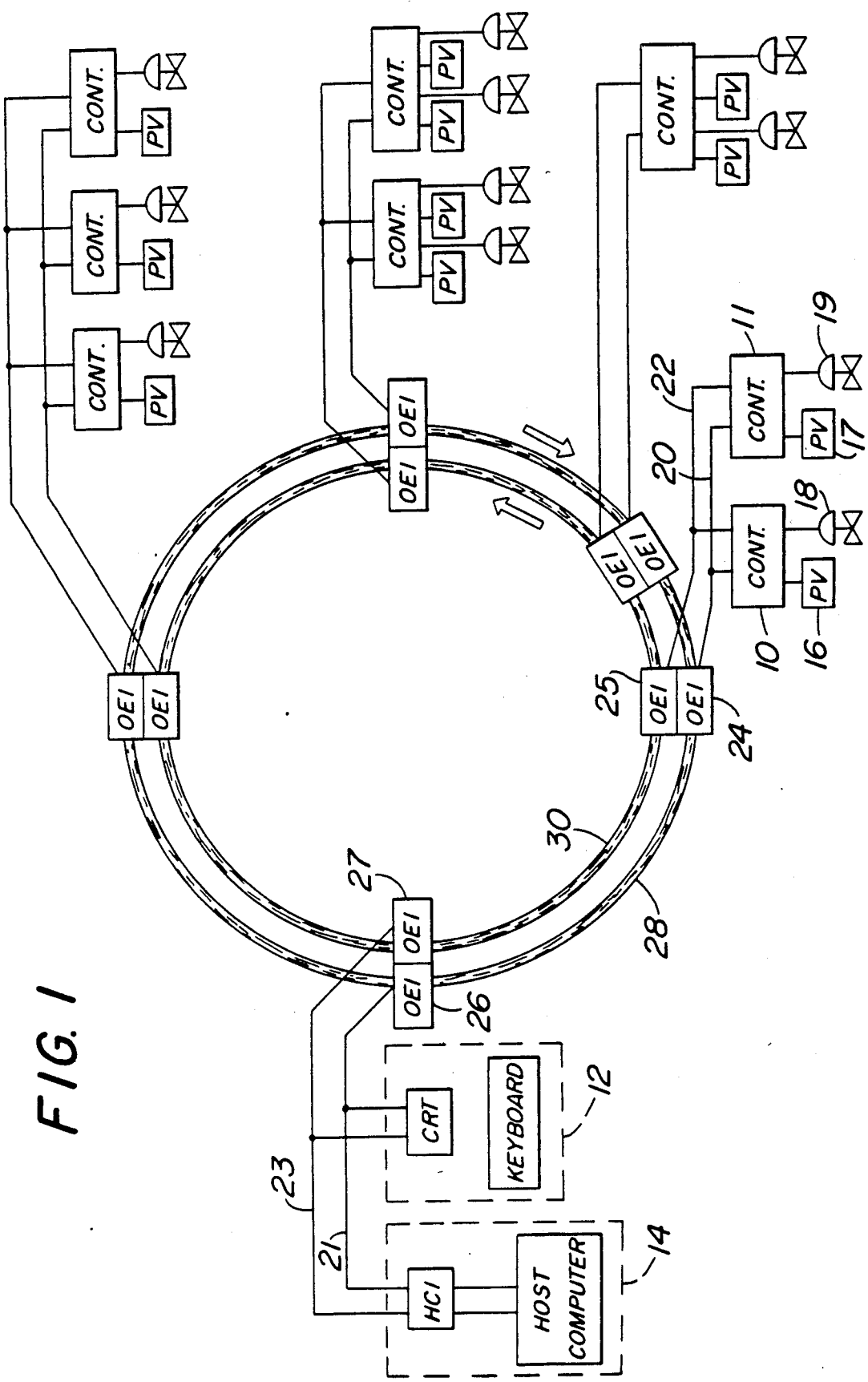
FIG. 1 illustrates a distributed process control system embodying the present invention.

FIG. 1 illustrates a distributed process control system embodying the present invention. This system is shown as including a number of stations such as the controller stations 10 and 11, the operator station 12, and a host computer station 14. The controller stations are shown as receiving inputs relating to the magnitude of process variables PV from measuring units such as 16 and 17, and producing a control signal to associated control valves such as 18 and 19 for the control of the loops of the process.

The controller stations are shown in groups which are interconnected by a redundant multi-drop type electrical data network made up of a pair of cables such as 20 and 22. These local data highways or networks are each connected to a corresponding node, such as nodes 24, 25, 26, and 27, of a dual simplex optical repeater ring of the global data highway, shown as fiber optic cables 28 and 30. The nodes of the global highway are each an Optical-Electrical interface (OEI) which couples the local electrical network cables such as 20, 21, 22, and 23, with the global filter optical cables 28 and 30.

As shown in FIG. 1, the optical data highways 28 and 30 are arranged so that the transmitters of the OEI'- carry data in opposite directions around their individual ring configurations. In the event there is an interruption in either of the rings as by the inoperability of a retransmitter, then communication is provided by the other ring. Also, in the event that both optical cables are broken in the same location, there is still continuity of communication.

The operation station 12 and host computer station 14 are connected to the global highways by a pair of local data network cables 21 and 23 and repeater nodes 26 and 27. The operator station will normally include a cathode ray tube and a keyboard with the appropriate microprocessor and associated elements to provide for interfacing an operator with the system for monitoring and other operating functions. The operator station will also frequently include a printer and disc file.

The host computer is connected to the local data network by the host computer interface HCI. It can be used for a number of control functions.

The most used type of computer control carried out by the control stations will be a supervisory type of control wherein the host computer generates setpoint updates for the control loops and transmits those values over the data highway to the appropriate control station which then carries out a normal PID control function by means of a supervisory algorithm in the control station. In the event the computer relinquishes control, the algorithm can revert to a normal PID control holding the last setpoint, or it can be configured to revert to manual control, if required.

The computer can generate updated setpoint values continuously, based upon system models and special algorithms. Normally only a fraction of the control loops will be on supervisory control and they will normally be updated at a slow rate such as once every five seconds.

The host computer can also be employed for direct digital control on those control loops where conventional PID control is unsuitable. Normally in such cases the control algorithm requires several process variable measurements and utilizes nonlinear control or linear programming to attain some optimum operating condition. The calculated desired valve position or the multiple valve positions determined by the operator are sent over the data highways to the appropriate controller for producing the required valve currents.

The desired setpoint values for the various control loops are usually entered by the operator at the operator station 12 while the process variables are measured by the control station as previously mentioned and where the computer is involved in the control function, these values are sent to the computer over the data highway.

With the arrangement of FIG. 1, each of the control stations can communicate with other control stations, with the host computer, or with the operator station. Likewise, the operator station and the host computer station can communicate with any of the control stations or between themselves.

The data highway system of FIG. 1 is a high speed, high data rate, real time communication network. It may, for example, be designed to operate with 31 nodes in the global optical highway, spanning distances on the order of 20,000 ft. with a maximum of 7,000 ft. between adjacent optical-electrical interface nodes. The local networks connected to the nodes may, for example, connect between 15 stations over a distance of 200 feet. Data may be transmitted from this network at rates on the order of 500,000 bits per second. The interchange protocol can be made simple to facilitate high speed processing and still provide flexibility for future additions and the frame format can be based on the High Level Data Link Control (HDLC) format with appropriate extensions for the particular environment.

The highway system supports transactions that are either closed or open. Closed transactions have explicit responses and open transactions have no explicit responses. Closed transactions are simple query/response interchanges or complex sequences to insure correct message transfers. Transactions are either link control or information carrying. Closed transactions are composed of a query message from the master (primary) and the response from the slave (secondary). The query message may be a question or a command and the response message an acknowledgement or answer. Messages may be up to four frames long where a frame is information bracketed by the address, control, and error detecting bytes. A 272 byte frame, for example, may be established as the maximum frame size to maximize the effect of the error detecting codes. Further, the control field and information field key the message for the number of bytes within the message, for error detecting capabilities.

In the communications network, the transfer time for the information to be sent from one station to another is directly proportional to the network's efficiency and network rate. The information rate can be established at 500,000 bits per second, the overhead minimum network can be divided into three components. The first, which can be addressed independently from a master, is the algoritm of token passing. The distributive highway system rotates the token as fast as the stations will allow when there is no useful work to be performed, the token slows down as the workload increases. Therefore, it can be seen that the token overhead is inversely proportional to the data rate. The second component is the overhead of each frame. This overhead can be minimized while still providing all of the information to insure reliable transfers. The distributed data highway minimizes the number of overhead bytes by transmitting the information as effectively as possible in encoded fields. Provisions can be made for future additions by using only 25%, for example, of the available decodes. Thirdly, the overhead on a message is caused by the pressure in generating the message. In other words, the computer or microprocessor processing directly affects the number of layers involved in generating the message. This overhead of generating a message is commonly called turnarounds. In order to maintain the real-time properties of the distributed system, the turnaround time must be minimized.

The communications format is frame oriented. Multiple frames may be concatenated within a message. Information is bracketed by a preamble and a postamble. A frame may be composed of only a preamble and a postamble. The preamble is a flag byte, destination address byte, control byte, and a source address byte. The postamble is a two-byte Cyclic Redundancy Check (CRC) character and a flag byte. The control byte and source byte are both expandable to additional bytes. The flag bytes and CRC bytes conform to the High Level Data Link Control (HDLC) procedure specified by the International National Standards Organization (ISO). The destination address provides the address the frame is being sent to. The source address is the address of the sending station. The control field contains either the function code or link code of the frame. The function code is used to start a message indicating which operation is to be performed. The function code encodes the following functions into four bits: Read, write, command, read check, write check before execute, command check before execute, response data, response command, and ACKNOWLEDGE. The link code defines the operational state of the link. The link code operation is encoded into a four-bit field. The link codes are: no-op; execute, busy; link reject; continue 0, 1, 2; IGAP; GAS; GAPS; GAE; GARE; and Acknowledge. All control bytes are expanded by a one bit key. The end of the message is indicated by a unique bit. The extended control bytes provide the delayed response permitted indication and the routing address of the destination. The CRC is the remainder of a modular two division of the complete transmission, less the flags. The generator polynomial is the recommended CCITT divisor. Data transparency is provided by the HDLC zero bit insertion procedure. All bytes are transmitted-least significant bit first and multiple byte information is transmitted, low order bit first. Any frame may be aborted at any time up to when the last flag byte is transmitted by a special bit pattern called "abort".

The communications network control is distributed to all stations that wish to establish a logical connection with any other device (mastership). The mastership of the system is passed from station to station. When a station receives the mastership, it can initiate a transaction. The passing of mastership is called token passing and is a sequence of interchanges of link codes. The token passing algoritm categorizes the station as high usage devices and low usage devices. High usage devices are passed the mastership in a high traffic loop. Low usage devices are divided up into two low traffic loops. The high traffic loop stations receive mastership on a line availability algorithm where the system's parameters guarantee mastership a minimum number of times. The low traffic loop devices receive mastership on a time-dependent algorithm. The two low traffic device times are offset to minimize their effect on the high traffic loop. The token (symbol of mastership) is passed from the high loop to the low loop by a high traffic station. A class of stations (system monitors) monitor the token to ensure correct operation and further correct any malfunctions. The system is self-balancing with initialization by outside intervention. Once the initialization procedure is started by a station, all stations monitor the sequence. Stations which have malfunctioned are removed from the normal loop operation and periodically placed in the loop until permanently removed by an initialization sequence or when the malfunction has been corrected. Each station must limit its transaction time and the time it retains the token. System monitors will further monitor the highway for stall outs. When a device receives the token and would like to inform the entire system of its operational status, it will broadcast its status to all devices and key the token passing that it has done so.

Figure 2:
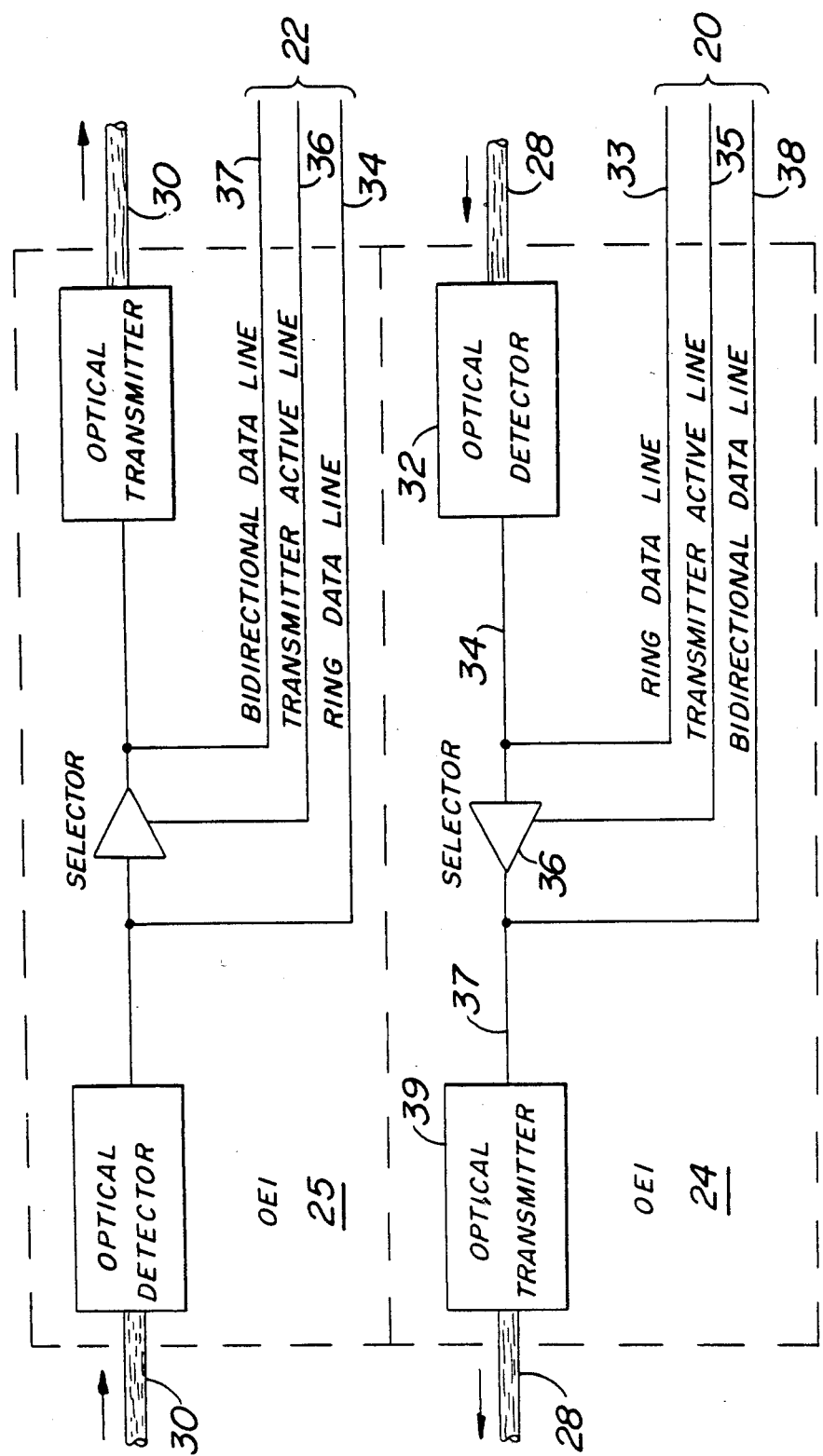
FIG. 2 illustrates an Optical-Electrical interface (OEI).

FIG. 2 shows in more detail the Optical-Electrical Interfaces such as 24 and 25. These units each have one transmitter-receiver combination. Each transmitter-receiver combination converts optical data from the cable to an electrical form and back again to the optical form for retransmission. Thus, the optical detector 32 is a receiver which receives data from the fiber optic highway 28 in the forward (clockwise) direction and converts it to electricl data on line 34. If none of the stations 10 and 11 connected to the local network lines 20 and 22 is transmitting, then the signal received by 32 passes through control element 36 to line 37 for retransmission by optical transmitter 39 over optical fibre 28 to the next Optical-Electrical Interface 26 and so on around the global highway ring. This continues until the signal arrives at an Optical-Electrical Interface which is connected to a local data network having a station which is transmitting. The Optical-Electrical Interface with a transmitting station is conditioned so as not to retransmit the received signal. Thus, for example, if station 10 was granted mastership and had access to the data highways, it would transmit a control signal over Transmitter Active line 35 would be effective to cause control element 36 to block signals on line 34. In this case OEI 24 would cease to operate as a repeater. Thus, messages transmitted from the station 10 would go over the Bidirectional Data line 38 to the transmitter 39 from which they would be transmitted over cable 28 and be repeated by the successive Optical-Electrical Interfaces of the global highway and eventually received by receiver 32. Those messages would then be transmitted back along the cable Ring Data Line 33 and would be picked up by station 10 which could then confirm that the global highway was intact. Thus, the transmitting station uses its transmitted signal to check on the continuity of the optical ring.

If the station intended as the destination of the message transmitted by station 10 happened to be station 11, which is on the same local data network with station 10, then it would have received those signals over the bidirectional Data line 38. This is also the case where the receiving station is connected to another Optical Electrical Interface in that the signal will be received by that station over its Bidirectional Data line. All stations are listening at all times so that they can accept transmission intended for them.

The metallic wiring as shown in FIG. 2 is in duplicate in that lines 34, 36, and 37 carry the same signals as lines 33, 35, and 38, respectively. These lines are each a twisted pair of metallic wire. The three different lines shown are a Bidirectional Data line, a Ring Data line, and a Transmitter Active line. Whenever a station is transmitting on a local data network, both of the duplicate wirings are used and in the same way. In receiving messages both are used to carry the received message for that message is propagated around both optical rings 28 and 30 simultaneously. The modem at the destination station accepts the first valid signal which it detects from the duplicate lines.

The stations on the local networks are connected via the EIA RS485 party line technology and, of course, each device on the local networks has a microprocessor and associated logic to carry out its function and the necessary modem for interfacing with the network. The network's information is modulated using frequency-shift-keyed modulation shifting between three frequencies (a prefix, logic zero, and logic one), which are respectively 2 MHz, 1 MHz, and 0.5 MHz. As mentioned the information to be transferred over the local network is presented on both sets of lines 20 and 22, simultaneously. Both sets of lines in the network are, of course, totally independent of each other, that is, each has its own receiving gate and driving gate with the modem selecting the first valid information stream.

It will be evident that the global data highway of FIG. 1, as well as the local data networks, are both redundant and thus the system will be extremely tolerant to single fault conditions.

The optical data highway of this invention replaces the normal electrical highway which is commonly used but which suffers from bandwidth limitations and also presents a safety hazard in certain surroundings. In addition, the optical data highway is not subject to radio-frequency interference as would be the case with an electrical highway.

The ring configuration is used for the global highway in this invention instead of the normal star configuration because of the fact that the star configuration requires excessive cabling costs since each node would necessarily be connected to each of the other nodes through a central mixing-splitting device.

Figure 3:
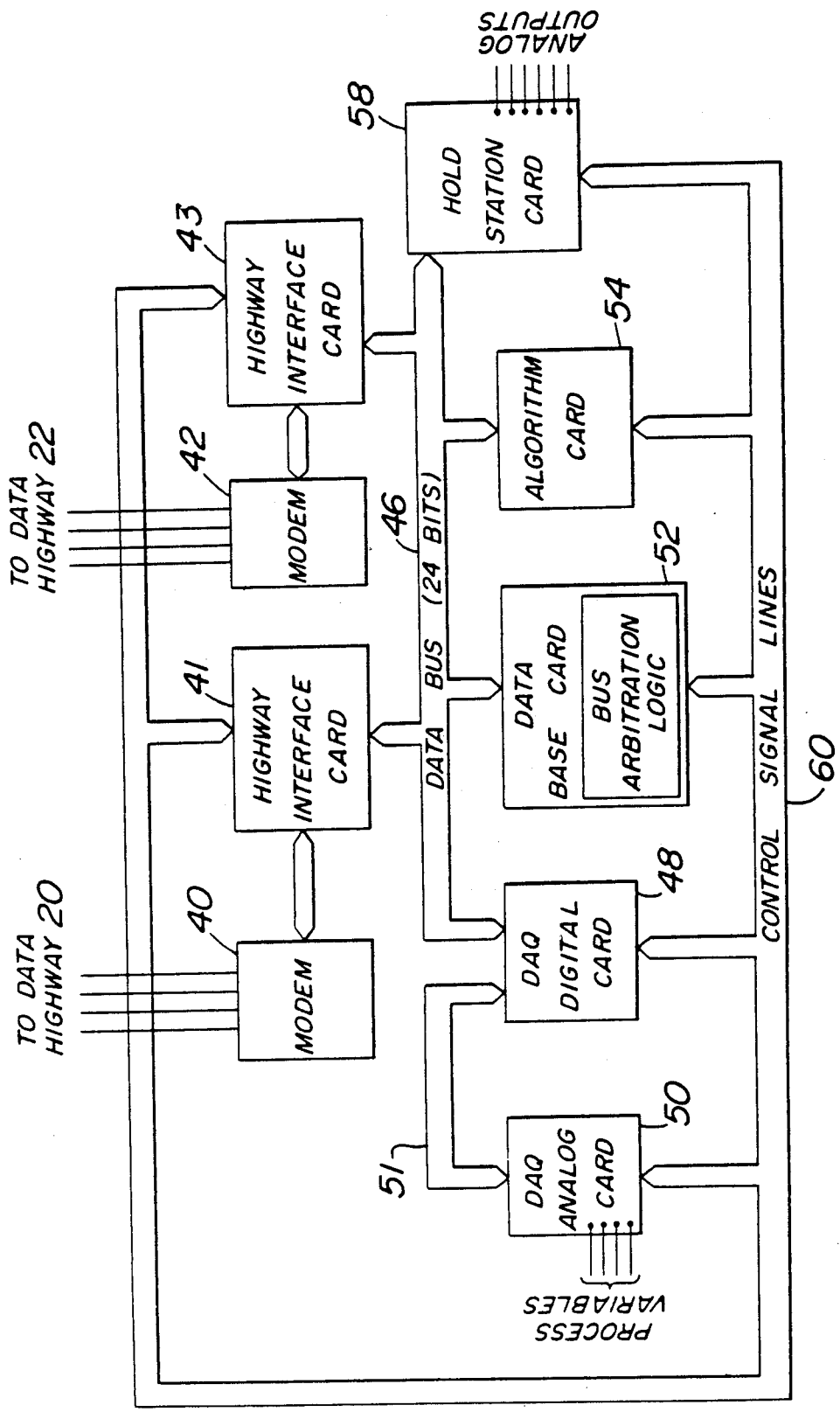
FIG. 3 illustrates a control station of the system.

Each of the controller stations, such as stations 10 and 11, is constructed as shown in FIG. 3.

The connection of the controller stations to the local data network is provided by way of the modems 40 and 42. The modem cards serve to convert data from the Highway Interface cards 41 and 43 respectively into a modulated signal which may be sent on the data highway and to demodulate signals from the data highway before sending them to the Highway Interface cards.

The Highway Interface cards 41 and 43 receive data from the data bus 46. The data bus 46, as noted, may, for example, be suitable for carrying 24 bits in parallel. The data bus, of course, serves to provide an intercommunication channel between the various printed circuit cards which make up the controller and, as shown in FIG. 1, the data bus is connected not only to the Highway Interface cards but also to the Data Acquisition Digital card, the Data Bus card, the Algorithm card, and the Hold Station card. The Data Acquisition Digital card 48 includes a microprocessor and the necessary logic circuitry so that it can perform the function of acquiring digital input data from the Data Acquisition Analog card 50 over the bus 51 so that the information acquired can be transmitted to the Data Base card 52, the Algorithm card 54, or to the Hold Station card 58.

The Data Base card 52 may, for example, include CMOS RAM storage such as may be required to provide information as to the algoritm which is to be used for the control. The data base serves as one of the resources for the controller of FIG. 3 and provides the central memory storage needed to operate the system. The other resource of FIG. 3 is provided by Hold Station card 58 which, as shown in FIG. 3, provides analog outputs to the control devices such as valve 18 and 19 used to operate the process under control. The Hold Station card contains a number of digital to analog converters for the purpose of converting the digital information supplied over data bus 46 to analog form as, for example, to a current output indicative of the position required for the process control devices being operated.

The Hold Station card is under the control of the Algorithm card 54. The Algorithm card itself includes a microprocessor and logic circuitry as required to execute the control algorithms which are to be used for the control functions of the controller of FIG. 3. After the Algorithm card has used the particular algorithm to determine the output required for control, the Algorithm card writes the digital form of these outputs to the main data base on card 52 and also to the Hold Station card 58.

It will be noted that the analog inputs in the form of process variables, as measured in the process under control by elements such as 16 and 17, are provided as inputs to the Data Acquisition Analog card 50, which is shown as being connected over bus 51 to the Data Acquisition Digital card 48. The various cards 41, 43, 48, 50, 52, 54, and 58, are all interconnected by way of control lines 60 which provide for the intercommunication between the various cards of the several control signals required to provide the necessary control of the operations of the various cards involved.

As has been mentioned above, the Highway Interface cards 41 and 43, the Data Acquisition Digital card 47, as well as the Algorithm card 54, all contain microprocessors which must communicate with each other for the proper operation of the system and which must, in some circumstances, communicate with the Data Base card 52, or the Hold Station card 48, which act as resources for the system. For this intercommunication, the data bus 46 is provided.

Figures 4, 6:
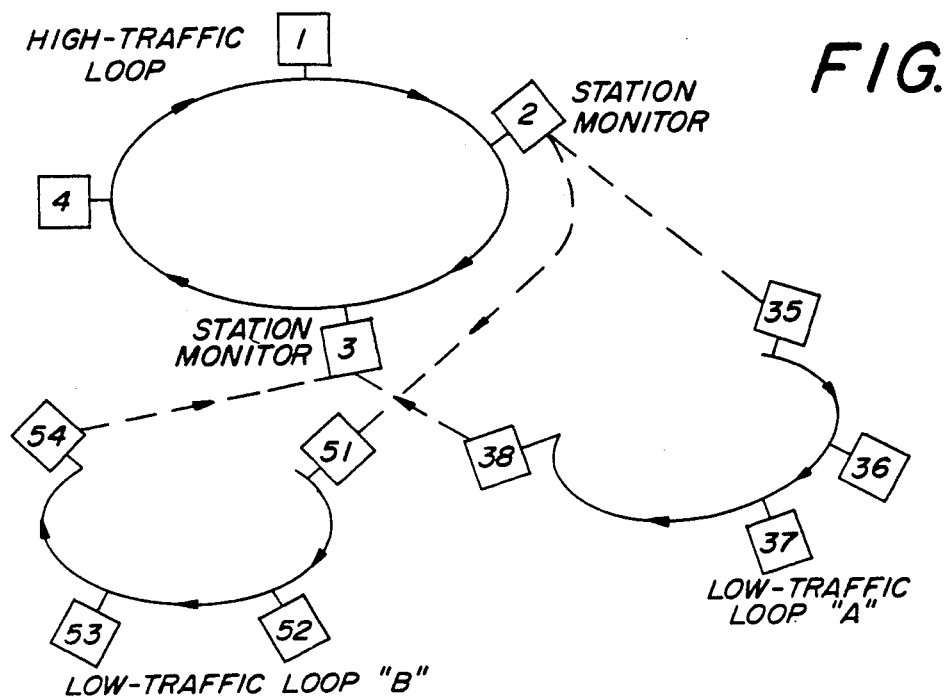
FIG. 4 illustrates one logical arrangement of the high and low traffic loops.
FIG. 6 is an example of a system map kept by a monitor station showing which stations are in operation.

Stations which are master stations have the potential for sending commands to another station. Some of the master stations are called monitors in that they have the ability to monitor or eavesdrop on the highway. The monitor stations not only determine if the highway is functioning properly, but also keep track of which stations are active and capable of receiving mastership. This is done with a system map as shown by FIG. 6 which will be described below.

The stations which are not system monitors receive messages for their station address as well as those for the universal address, that is, those which are sent to all stations without requiring a reply. Ohter stations may operate as remote stations for data acquisition and storage but without the ability to assume mastership.

As stated before, the communication network is divided up into three address spaces which are logical loops: these are a high-traffic and two low-traffic loops. The high-traffic loop has addresses 1 to 31 and the first low-traffic loop A has addresses 32–47 and the second low-traffic loop B has addresses 48 to 63. The token is passed normally around the high-traffic loop at the maximum obtainable speed. A monitor station will pass the token to either of the low loops, starting at the lowest active address of that loop. The token is passed through that loop and return to the high loop by the last active station in that loop. The high loop return address is carried in the Go Ahead Return Execute (GARE) message. The monitors pass the token to the low loops once every half second with low loops offset by $\frac{1}{4}$ sec. To insure system performance, each station can hold on to the token for no more than 50 ms.

Stations participating in the mastership transfer process in the high-traffic loop have two data bytes of storage to retain a permanent and temporary address of the next valid station in the high-traffic loop to which it will pass mastership. The permanent pointer is set during the IGAP sequence, as explained below. The temporary pointer is set during startup and abnormal operation. The highest numbered active high-traffic station's pointer points to the lowest numbered high-traffic station. System monitors which may jump to the low-traffic loops will also maintain pointers containing the lowest numbered active low-traffic station address of each low-traffic loop. This pointer is set either by the IGAP sequence being executed by that system monitor or by eavesdropping on other system monitors. The highest numbered active low-traffic station's pointer in each low-traffic loop will point to the lowest high-traffic station. This will be effective to cause the return to the high-traffic loop to be in accordance with the return address carried by GARE. This token passing scheme is illustrated in FIG. 4 where station 2 is shown passing the token to low-traffic loop A by passing it to the lowest numbered active station in that loop, namely 35. This token pass occurs when the time period set for passing to loop A has passed. The token then passes successively to 36, 37, and 38. Station 38 returns the token to the return address carried by the GARE message, namely station 3. After another time period has passed, the token is sent to the other low-traffic loop B. Thus, if station 2 had the token when this time period expired, it would pass the token to station 51, the lowest numbered active station in loop B. As before, the token is passed successively through loop B, stations 52, 53, and 54. Station 54 then returns the token to the address in the high-traffic loop carried by the GARE message, namely station 3.

The current master, upon concluding normal traffic, will initiate a Go Ahead Sequence (GAS) on the active data highway channel. If the specified station completes the GAS sequence correctly, it will, within 100 microseconds maximum, place the link in an active link state. The current master shall detect carrier ON and consider the transfer sequence to be successfuly completed.

If the current master does not detect this condition within 200 microseconds, it will consider the attempt to transfer as failed, and enter a recovery procedure as specified below.

On failure, the current master attempts a second time to transfer mastership to the next station by repeating the GAS command on the primary data highway channel. If this attempt fails also, it will issue the GAS command to the same station. If the transfer still failed, the current master will move the permanent address into the temporary address, increment by 1 and repeat the procedure. If the transaction is again not completed, the temporary address is incremented again and again until the mastership is successfully transferred or until the Go Ahead Pointer value equals the current master's address.

If the above procedure was initiated by a high-traffic loop station, the permanent address would be used once a second and the temporary address regenerated for that transfer. All other mastership transfers within the second would be made through the temporary address.

If the Go Ahead Pointer ever increments to equal the current master's address, the master will cease transmission and let the Data Highway completely stall.

If the current master shall fail, preventing initiation of the Go Ahead Sequence, the data highway will stall out. At this time selected devices with Systems Status Monitor capability will initiate a Restart of the data highway link.

When a device is powered up, the permanent Go Ahead Pointer is set to the station address +1 and the token is passed via the normal algorithm.

Transfer of mastership utilizes the following commands:

IGAP—Initialize Go Ahead Pointers. When a station receives this command, it sets its permanent pointer to its station address plus one. This is an operator initiated instruction used when a new station is added to the highway or when a failed station has been repaired. IGAP initiates a search for the next active station in a loop so that the next active station can be used from then on for mastership token transfers. IGAP is normally broadcast to the highway but may also be directed to one station, in which case an ACK is returned to the sender indicating that the station has set its next station address to its station address plus one unless that results in 32, 48, or 64, i.e., at the end of the loop, in which case the next station is set to "1" so that the token will return to station No. 1 on the high traffic loop. The loop utilized flags are set to indicate that a GAPS code should be used for the token passing next time instead of a GAS so that the highway monitors will know that a search for the next active station is being performed. The first address in each low loop is reset and the system map of permanent next stations is reset.

GAS—Go Ahead Select. The GAS command is used to select the next master during normal token transfers. The GAS command signals the intent of a station to pass the token and the reception of a GAS command when a station is a highway slave primes the station to receive the mastership token. An ACK is returned on the highway and the station is primed to accept a GAE as the next command. Also certain token monitoring functions are done as a result of this command.

GAPS—Go Ahead Pointer Select. The GAPS command is used when a station is zeroing in on the normal next station address. This zeroing-in sequence takes place during the first mastership pass after the IGAP is received. The station receiving a GAPS command treats it exactly as a GAS reception but in addition it updates the permanent and current system map entry.

GAE—Go Ahead Execute. The GAE command is used to complete the token passing sequence once the present master has assured itself that the next master is capable of being master. Most of the work associated with token passing occurs upon the observation of a GAE command. This work includes a number of housekeeping chores.

GARE—Go Ahead Return Execute. A GARE command performs the same function as the GAE command except it contains a return station address. It is used exclusively in the low-traffic loop. The last station in a low-traffic loop will use the return address to indicate the station in the high-traffic loop to which the token is to be passed.

ACK—Acknowledge. Acknowledges are ignored by the monitor unless they follow a GAS or a GAPS. When following a GAS, the monitor checks to see that it was an ACK from the expected station. When following a GAPS, an additional check is made to see whether this is the first station in a low loop to respond with an ACK. If that is true, the saved, permanent, and current first low loop address is set to the station of the ACK.

It will thus be evident that the mastership transfer sequence is as follows:

1. Master station issues the GAS or GAPS command to the station address of its permanent pointer.

2. The addressed station acknowledges (ACK) the GAS or GAPS command from the master.

3. The master having received ACK issues a GAE or GARE command to the station intended to receive the token indicating that the token has been passed to it.

4. The master station awaits an indication that the carrier has come on.

Figure 5A:
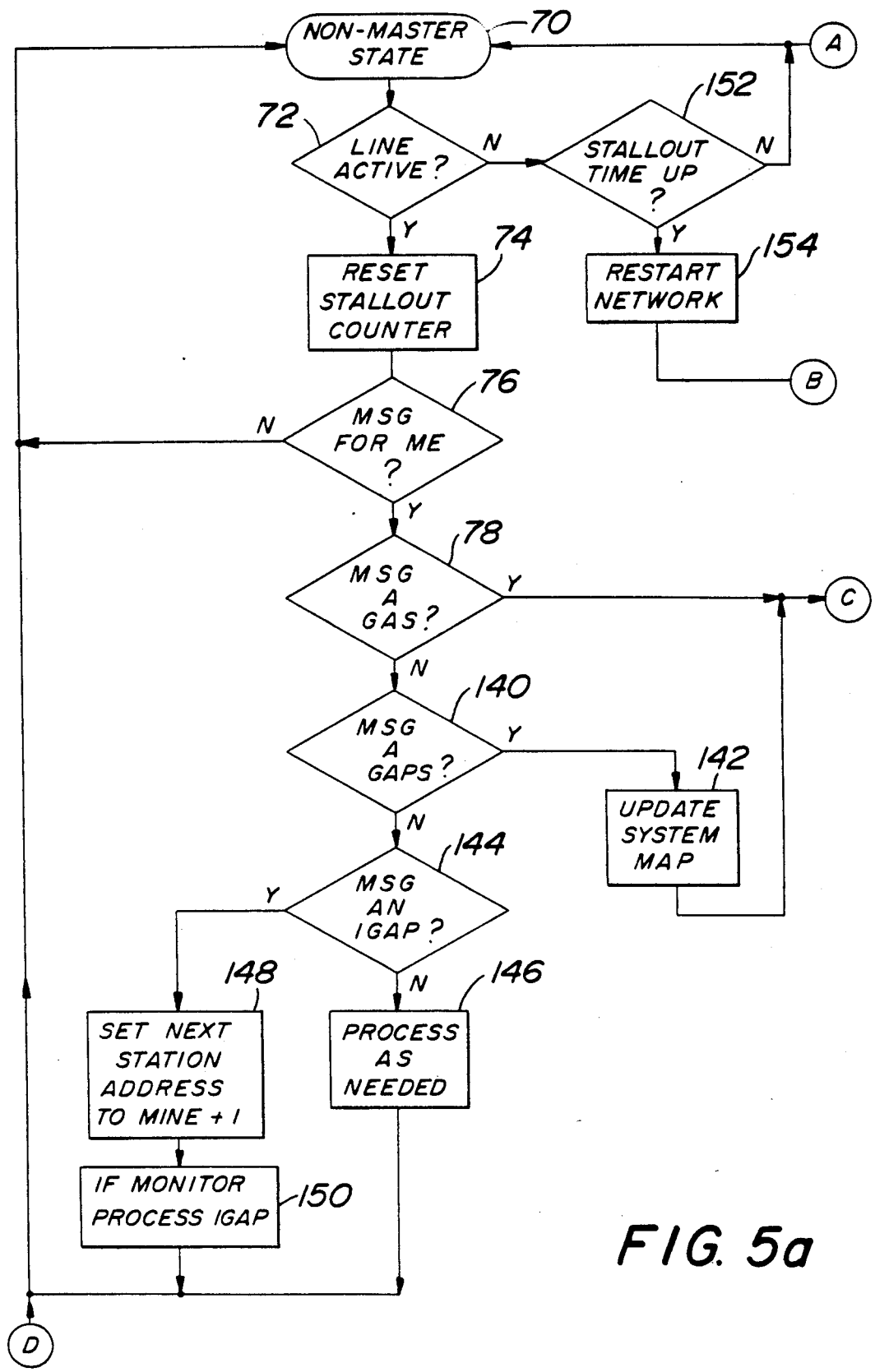
FIG. 5a, 5b, and 5c are flow charts which, when taken together, show the algorithm for controlling the token passing between the stations.
Figure 5B:
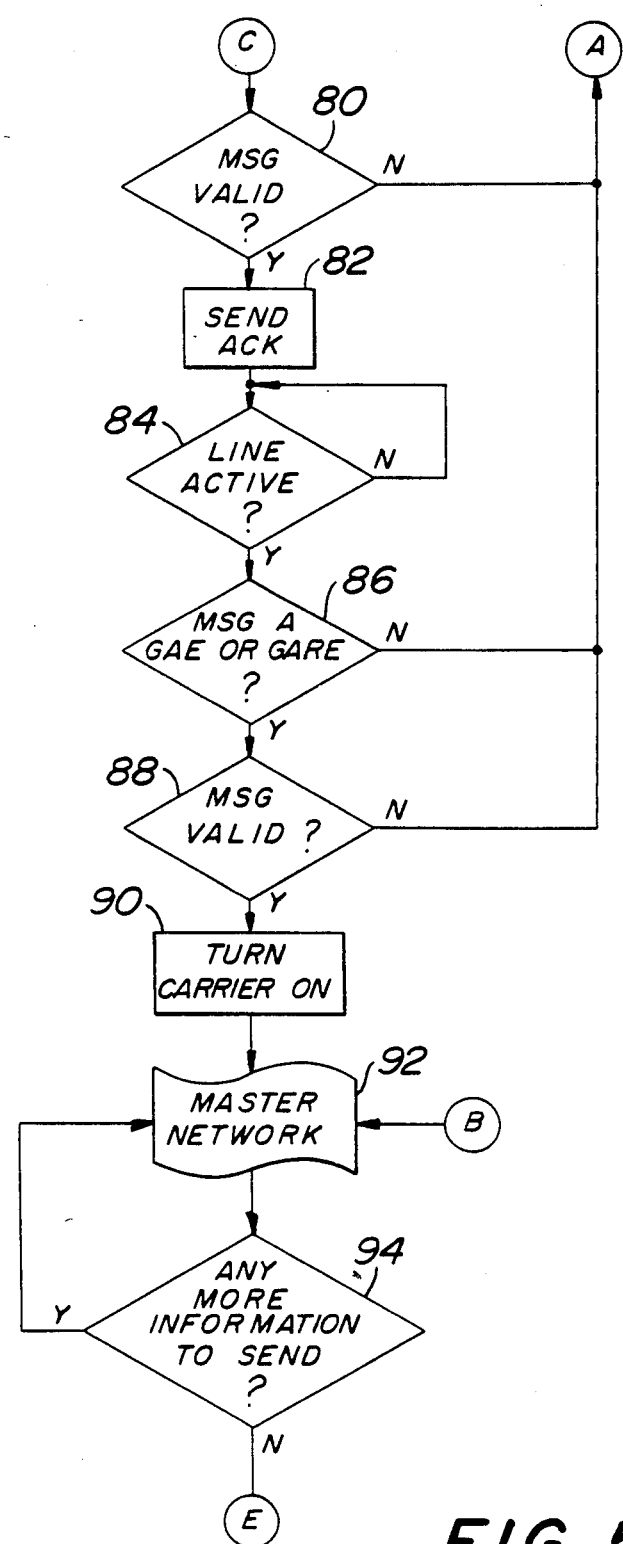
Figure 5C:
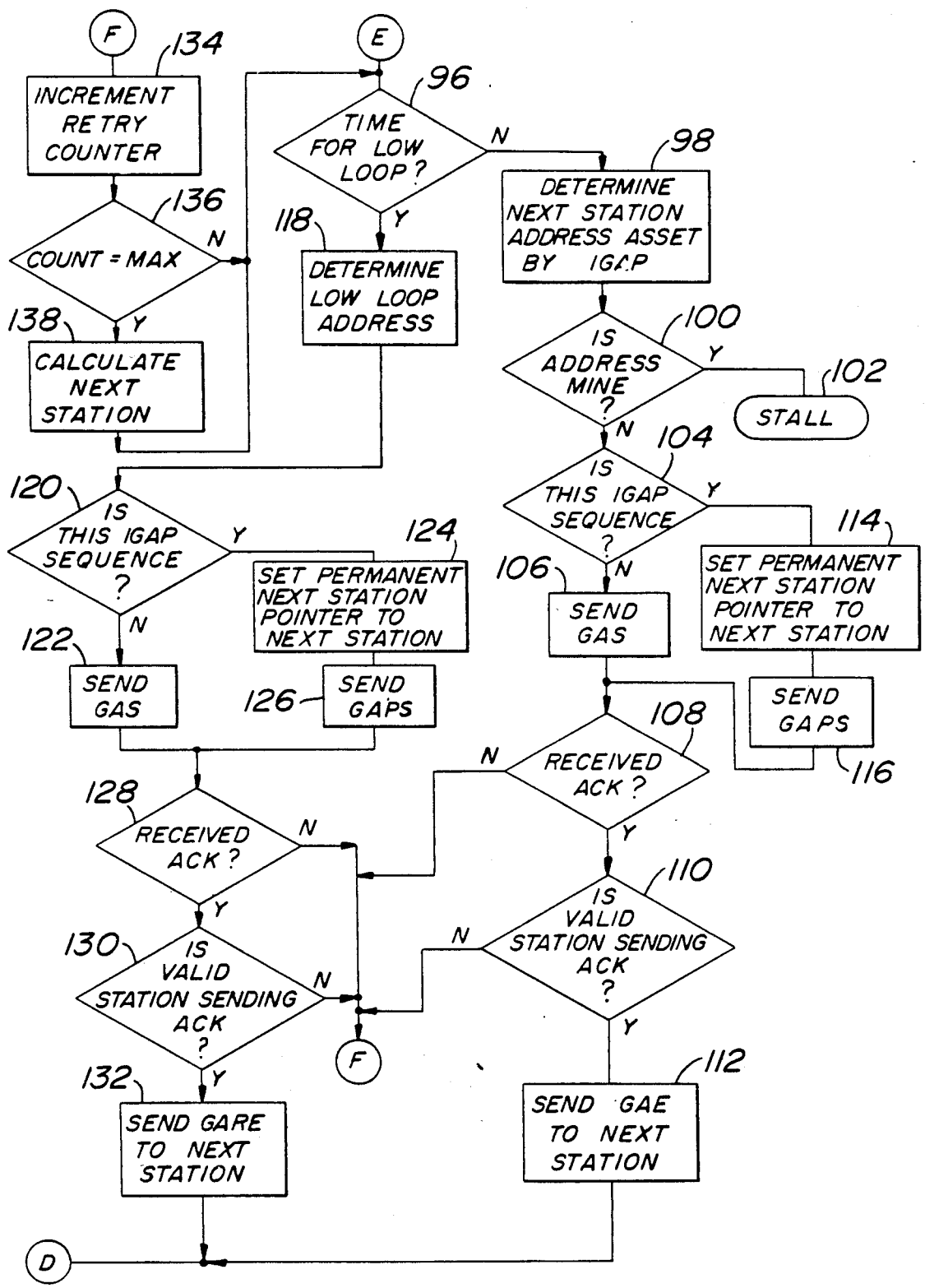

A token passing algorithm is shown in FIGS. 5a, 5b, and 5c.

When the station is in a non-master state (block 70) and the line becomes active (block 72), indicating a carrier or a transmission is occurring, the stall out counter is reset (block 74) and the message is examined to see if it is for this station (block 76). If it is, it is determined whether or not the message is a GAS (78). If a GAS has been received for this station, the message is tested for validity (block 80 and correction C) and if valid, an ACK is sent (block 82) back to the present master. The program then tests to see if the line is active (block 84) and if so, if the message is a GAE or a GARE (block 86). If it is, the message validity is determined (block 88) and if the GAE or GARE message is valid, the carrier is turned on (block 90) and the mastership flag is raised (block 92) indicating mastership has been transferred to this station. The station then goes about making the transmission necessary to carry out its function, and when no more information is to be sent (block 94), the program then operates to transfer mastership to the next station (correction E). It is first determined whether or not it is time to go into a low priority loop (block 96) and if it is not, there is a determination made of the address for Next Station as stored in the permanent address pointer during the IGAP procedure (block 98). If the address in the permanent pointer is this station (block 100), then a stall-out condition is allowed to occur (block 102) for that indicates that during the previous IGAP a search was made for the next active station in the high priority loop and none was found; therefore, the only station active is this station. This makes it impossible to transfer mastership and a stall condition is appropriate.

If the address in the permanent point is not this station, then a determination is made as to whether or not this is an IGAP sequence (block 104). An IGAP sequence is the sequence of mastership transfers following an IGAP command. If it is not, a GAS message is sent to the address in the permanent pointer (block 106) and when an ACK is received (block 108), its validity is checked (block 110) and if it is valid, a GAE is sent to the next station (block 112). As evident from the algorithm in FIG. 5c, if it is determined that an IGAP sequence is occuring (block 104), then the permanent pointer is set to the Next Station address (block 114) and since it is an IGAP procedure, a GAPS command is sent instead of a GAS (block 116).

If this station determines that it is time for a low priority loop (block 96), the low loop address to which the token should be passed is determined (block 118) and if this is not an IGAP sequence (block 120), a GAS command is sent (block 122) whereas, if it is an IGAP sequence, the permanent pointer address is set to the Next Station (block 124) and a GAPS command is sent (block 126). When an acknowledgment (ACK) message is received in response to the GAS or GAPS (block 128), its validity is determined (block 130) and if valid, a GARE is sent to the next station (block 132) as shown in the algorithm of FIG. 5c. If the ACK is not received to the GAS or GAPS commands, or if they are not valid, the retry counter is incremented (block 134, correction F) as it is concluded that the station whose address is in the permanent pointer is not responding and therefore it must be tried again. Every time it is retried by resending the GAS or GAPS command, the retry counter is incremented until it reaches its allowable maximum count (block 136), at which time the algorithm calculates the next station by incrementing the number of the station in the permanent counter by one (block 138) then that station is tried by sending a GAS or GAPS command.

Returning to FIG. 5a, if the message received is not a GAS, then the question is asked to whether or not it is a GAPS (block 140). If it is a GAPS message, then the system map is updated (block 142). The system map is the tabular data such as shown in FIG. 6 which indicates for each station whether or not it is active and if so, what the address number is in the permanent pointer or, in other words, the address to which it will pass the token. As previously mentioned, these system maps are maintained only by monitor stations.

If the message is not a GAPS as determined in block 140, it is determined whether or not the message is an IGAP (block 144). If it is not, the message is processed as needed (block 146) since it is then not a message which involves the passing of the token. Otherwise, the address in the permanent pointer is set to this station address plus 1 (block 148) and if this station is a monitor, the IGAP message is processed (block 150). If this station's address plus 1 equals 32, 48, or 64 (the end of a loop), the next station address is set to 1. Also, the permanent address for the next station stored in the system map are reset to the station number plus 1.

As shown in FIG. 5a, when the line is not active, that is, when there is not a carrier on (block 72), then it must be determined if the stall out time is up (block 152). This determiniation is a predetermination as to whether or not a predetermined period has been exceeded, which period was set to be the maximum period during which, if the line is not active, it must be assumed that a stall condition has occured, and the network must be restarted (block 154). If the stall out time is not up then, of course, the station awaits an active line as stated in block 72.

Upon restarting the network (block 154) mastership is assigned again to this station (block 92 and connection B).

Referring to FIG. 5b, if the questions asked in blocks 80, 86, and 88 are answered negatively because of invalid messages or failure to get a GAE or GARE after acknowledging a GAS, then the program returns to await the next command (connection A). When the GAE or GARE commands are sent to the next station thus transferring mastership, the program returns to the beginning (connection D). The program also returns if the message is not for this station (block 76) and after the message has been processed (block 146) as well as after processing IGAP (block 150).

In the IGAP sequence the reception of the IGAP command causes the permanent pointer for each station "N" to be set to N+1 (block 148). That is the next station address determined in block 98. If an IGAP sequence is occurring then block 114 sets the permanent pointer to the next station as calculated by block 138. During the first attempt to pass the token after receiving an IGAP, that number is N+1, however, if N+1 is inactive and no acknowledgment is received (block 108), then the next station number is increased by 1 to N+2 and before sending the next GAPS (block 116), the permanent pointer is set to the new number (N+2). This sequence for incrementing the permanent pointer continues until a valid ACK is received.

FIG. 6 is a set of examples of a system map maintained by the monitor stations as it would appear under various conditions. For example, the first column shows a system map which would be applicable after power up initialization has occurred. Under that condition, all of the stations are identified as having in their permanent pointer the address of the next station (N+1) except for the last station in each of the loops where the permanent pointer is set to one and all of the stations are identified as being inactive. In the maps of FIG. 6, the first number identifies the station number involved, the next number after the dash is the number of the station address in the permanent pointer. After the comma, the zero (0) identifies the station as being an inactive station and an x identifies the station as being active.

In column 2, the system map is shown for the condition in which all of the stations are active except stations 32, 63, and 3. Column 3 shows the system map under the conditions in which stations 33-47, 3-30 are not active.

In column 4, the system map for the conditions under which all stations are active except station 2 are shown, while column 5 shows the system map for the condition in which stations 33, 63, and 4 have come up after the map was in the state shown in column 4.

What is claimed is:

1. An optical communications system for interconnecting a plurality of stations under a rotating mastership to provide fault tolerant communications between the stations without the use of optical splitters or switches, comprising:
   a redundant data highway having two optical communication channels, each forming a separate ring for interconnecting all stations or groups of stations; and
   a plurality of optical-electrical interfaces inserted by pairs in series in each of said rings for redundant coupling of nearby stations to said optical channels and for continuously repeating the exact same transmitted data signals in opposite directions completely around said rings, said interfaces each including an optical detector for receiving optical data signals from one section of the associated optical channel and converting it to corresponding electrical signals, an optical transmitter for converting electrical data signals to optical data signals and further propagating them on another section of the associated optical channel, and coupling means for providing said nearby stations with reception from and transmission to the associated optical channel and for connecting said detector and transmitter to provide for the continuous repetition of signals received by said detector for propagation of said signals along said associated channel when no station coupled to the interface is transmitting and for preventing repetition when any station coupled to the interface is transmitting.

2. An optical communications system as set forth in claim 1 which includes means for providing reception by the transmitting station of the transmitted signals after they have gone completly around the rings for checking on the condition of the rings.

3. An optical communications system for interconnecting a plurality of stations under a rotating mastership to provide fault tolerant communications between stations without the use of optical splitters or switches, comprising:

a redundant data highway having two optical communication channels, each forming a separate ring for interconnecting all stations or groups of stations by carrying data signals in opposite directions; and a plurality of optical-electrical interfaces inserted in series in said ring for coupling nearby stations to the associated optical channel and for continuously repeating the exact same data signals completely around said ring, said interfaces each including an optical detector for receiving optical data signals from the associated optical channel and converting them to corresponding electrical signals, an optical transmitter for converting electrical data signals to optical data signals on the associated optical channel, means for coupling said nearby stations or groups of stations to the associated channel for reception from and transmission to that channel, means for connecting said detector and transmitter to provide for the repetition of signals received by said detector for propagation of said signals around the ring, and means for interrupting said connection to prevent repetition when any station coupled to the interface is transmitting.

4. A data communications system for providing communications between any of a plurality of stations or groups of stations, comprising:

a first fiber optic data highway connecting all of said stations or groups of stations in a loop configuration and enabling optical data to be transmitted from any one station completely around said loop for reception by a selected other station;

a second fiber optic data highway providing a redundant connection of all of said stations or groups of stations in a similar loop configuration enabling the exact same optical data to be transmitted from said one station to said selected other station in a direction opposite to that of said first highway;

optical electrical interface means connecting each of said stations to said first and second loops, said interface means each having a first transmitter-receiver in series in said first highway and a second transmitter-receiver in series in said second highway so that data signals are propagated completely around both of said highways and received by the transmitting station to provide a check on the continuity of said highways, said interface means also including means for disconnecting the transmitters associated with the transmitting station from the receivers associated with that station so that the propagation of said data signals does not continue around the loops more than once.

* * * * *